United States Patent [19]

Hirabayashi

[11] Patent Number: 4,509,331
[45] Date of Patent: Apr. 9, 1985

[54] KNOCK-FREE ENGINE CONTROL SYSTEM FOR TURBOCHARGED AUTOMOTIVE ENGINE

[75] Inventor: Yuji Hirabayashi, Zushi, Japan

[73] Assignee: Nissan Motor Company, Limited, Yokohama, Japan

[21] Appl. No.: 436,029

[22] Filed: Oct. 22, 1982

[30] Foreign Application Priority Data

Oct. 27, 1981 [JP] Japan ............... 56-170756

[51] Int. Cl.³ ............................. F02B 37/12
[52] U.S. Cl. ........................... 60/602; 123/425
[58] Field of Search .......... 60/600, 601, 602, 603; 123/425

[56] References Cited

U.S. PATENT DOCUMENTS 2,670,724  3/1954  Reggio ............... 123/425 X
4,178,891  12/1979  Latsch et al. .

FOREIGN PATENT DOCUMENTS 3106579  9/1982  Fed. Rep. of Germany ........ 60/602
2038412  7/1980  United Kingdom .
2083135  3/1982  United Kingdom ........... 60/600

OTHER PUBLICATIONS

"A Turbocharged Engine with Microprocessor Controlled Boost Pressure," Rydqvist, et al., SAE Technical Paper Series 810060 (1981).

Primary Examiner—Michael Koczo
Attorney, Agent, or Firm—Schwartz, Jeffery, Schwaab, Mack, Blumenthal & Koch

[57] ABSTRACT

In a turbocharged internal combustion engine, in order to optimize engine torque output spark timing control and boost pressure control are coordinated in such a manner that spark advance angle is adjusted only when the measured boost pressure equals a predetermined value and is allowed to vary only within a specified range advanced from a reference value derived from an empirical memory table on the basis of engine speed and boost pressure. When engine operating conditions are such that spark advance angle would fall outside of the specified range, spark advance angle is then held at the empirical value and boost pressure is adjusted in order to optimize engine torque. The coordinated control system can also be designed to respond to exhaust gas temperature on a first-priority basis, i.e., when exhaust temperature is sensed to be dangerously high, boost pressure is reduced regardless of other engine conditions.

18 Claims, 8 Drawing Figures

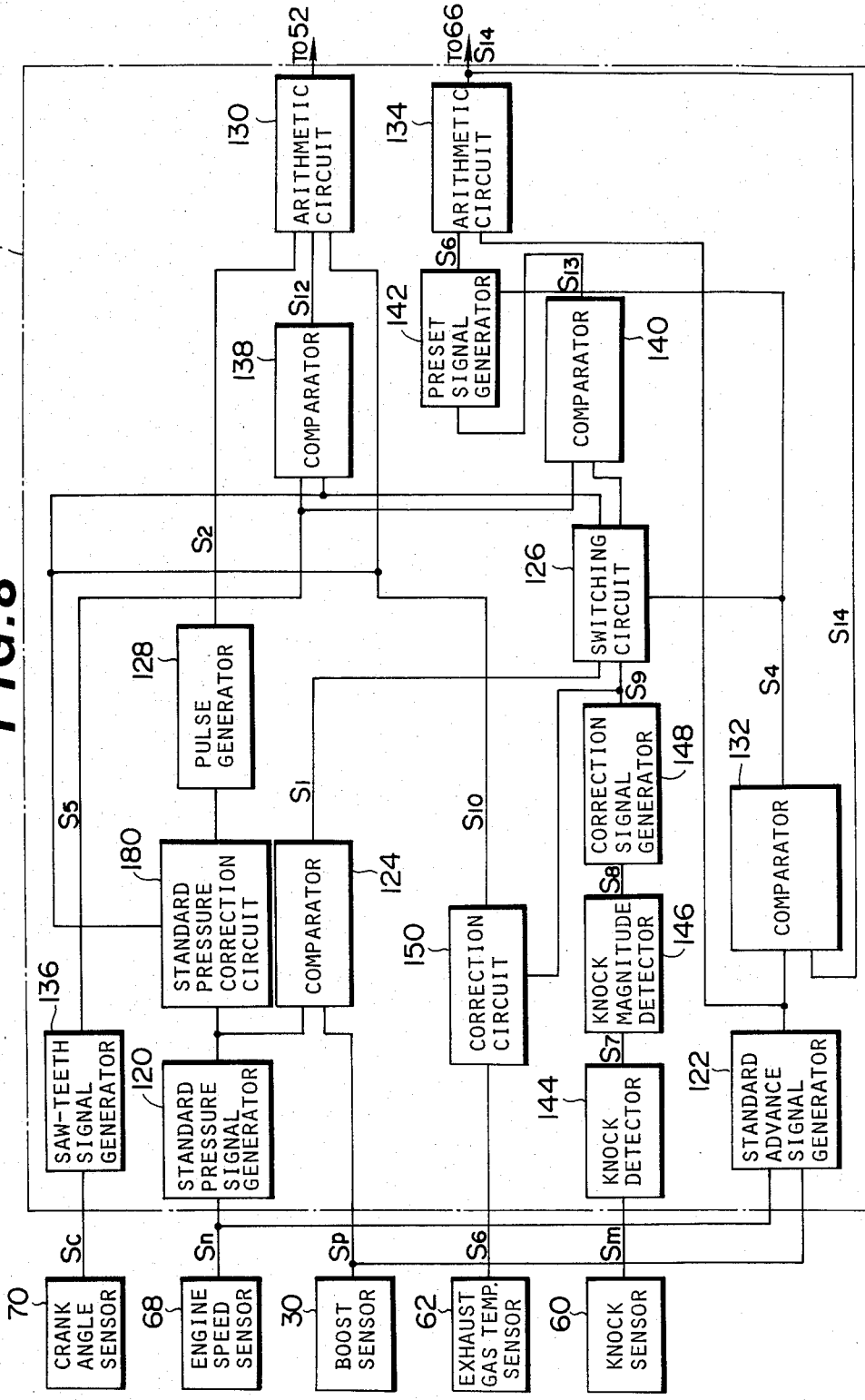

KNOCK-FREE ENGINE CONTROL SYSTEM FOR TURBOCHARGED AUTOMOTIVE ENGINE

BACKGROUND OF THE INVENTION

The present invention relates generally to an engine control system for a turbocharged internal combustion engine, particularly for an automotive gasoline engine. More specifically, the invention relates to a knock-free engine control for an automotive internal combustion engine with a turbocharger for preventing engine knocking and maximizing fuel efficiency and engine performance.

As is well known, a turbocharged engine has a much greater tendency to knock than non-turbocharged engines. This is because the intake air temperature of the turbocharged engine is rather high and the compression in the engine cylinder is higher than in non-turbo charged engines. Therefore, knock control or suppression in the turbocharged engine is more important than in non-turbo charged engines.

Conventionally, various attempts have been made to develop a knock control system responsive to engine knocking to control spark ignition timing and maximum charge pressure in order to avoid harmful engine knocking and increase of exhaust temperature, while simultaneously minimizing engine performance loss and keeping the fuel/performance efficiency at a reasonable level.

One approach has been reported in SAE Technical Paper Series No. 810060 (Feb. 23-27, 1981), by J. E. Rydquist et al. entitled "A Turbocharged Engine with Microprocessor Controlled Boost Pressure". In this report is disclosed an attempt at electronic or microcomputer control of a wastegate setting as well as spark timing when harmful engine knocking occurs. It is found in the report that experiments for knock control were made by controlling ignition timing only, charge pressure boost only and the combination thereof, and the final result is that the combination of ignition timing control and boost control is the most favorable.

As will be appreciated, the best torque range for engine performance varies significantly depending on fuel octane number and/or mechanical octane number. In addition, charge pressure and ignition timing are interrelated with respect to engine output. Therefore, frequent control corrections with reference to various engine operation parameters, such as corrections based on an intake air temperature, transient characteristics and so forth, are required to avoid an excessive increase of the exhaust gas temperature and to limit fluctuation of spark advance angle due to engine knocking in order to maximize engine performance while maintaining suitable fuel efficiency. Thus, knock control in turbocharged engines tends to be quite complicated and difficult.

SUMMARY OF THE INVENTION

Therefore, it is a principal object of the present invention to provide a knock-free engine control system which can simplify knock control by selectively controlling the spark timing and the boost or charged pressure of the engine.

Another and more specific object of the present invention is to provide knock control in a turbocharged engine which controls the spark advance angle to within a given angle range and controls the boost pressure to within a given pressure range when heavy engine knock occurs.

To accomplish the above-mentioned and other objects, there is provided a knock-free engine control system capable of performing ignition timing control and boost pressure control independently. The system includes a knock detector for detecting an engine knocking condition. The spark timing control is carried out within a limited spark advance range in response to a heavy knock condition of the engine. In addition, the boost pressure reduction is carried out when heavy engine knocking continues in spite of retardation of the spark advance angle to the given limit of the retard angle range.

According to one embodiment of the present invention, there is provided an engine control system for a turbocharged internal combustion engine for controlling spark ignition timing and charge pressure in an air induction passage, which comprises:

first means for detecting engine speed and producing a first signal having a value representative of the engine speed, second means for detecting charge pressure in the air induction passage of the engine and producing a second signal having a value representative of the charge pressure, third means for detecting the engine knocking condition and producing a third signal indicative of the engine knocking condition, fourth means for controlling charge pressure, the fourth means including a valve electrically controlled for controlling the charge pressure, fifth means for controlling a spark advance angle defining the spark ignition timing, and sixth means for operating the fourth and fifth means for controlling charge pressure and spark ignition timing depending on the engine operating condition represented by the first to third signals, the sixth means being responsive to the third signal to selectively operate one of the fourth and fifth means for knock prevention, the sixth means defining a variation range of the spark advance angle and a predetermined charge pressure and operating the fourth means to control the charge pressure while holding the spark advance angle at a given angle and operating the fifth means to vary the spark advance angle while holding the charge pressure at the predetermined charge pressure.

According to another embodiment, a method for performing knock-free engine control essentially comprises the steps of detecting engine speed, detecting charge pressure in an air induction passage of the engine, detecting a harmful engine knocking condition, controlling a spark advance angle in accordance with the engine speed and charge pressure in the air induction passage and with reference to a given standard spark advance angle, controlling the charge pressure in accordance with the engine speed and with reference to a given standard charge pressure, selectively performing the spark advance control and the charge pressure control depending on the engine operating condition, wherein the spark advance control is performed while the charge pressure control is disabled and the charge pressure is held at the standard charge pressure, and the charge pressure control is performed while the spark advance control is disabled and the spark advance angle is held at a given angle specified within a predetermined spark advance angle variation range relative to the standard advance angle, and the spark advance control is performed with regard to the spark advance angle at a given retard rate and the charge pressure control is performed to reduce the charge pressure at a given reduction rate, in response to detection of harmful engine knocking.

BRIEF DESCRIPTION OF THE DRAWINGS

The present invention will be understood more fully from the detailed description given herebelow and from the accompanying drawings of the preferred embodiments of the present invention, which, however, should not be taken as limitative to the invention but, rather, are for elucidation and explanation only:

In the drawings:

FIG. 8 is a block diagram of a modification of the embodiment of the control system shwon in FIG. 4.

DESCRIPTION OF THE PREFERRED EMBODIMENT

Figure 1:
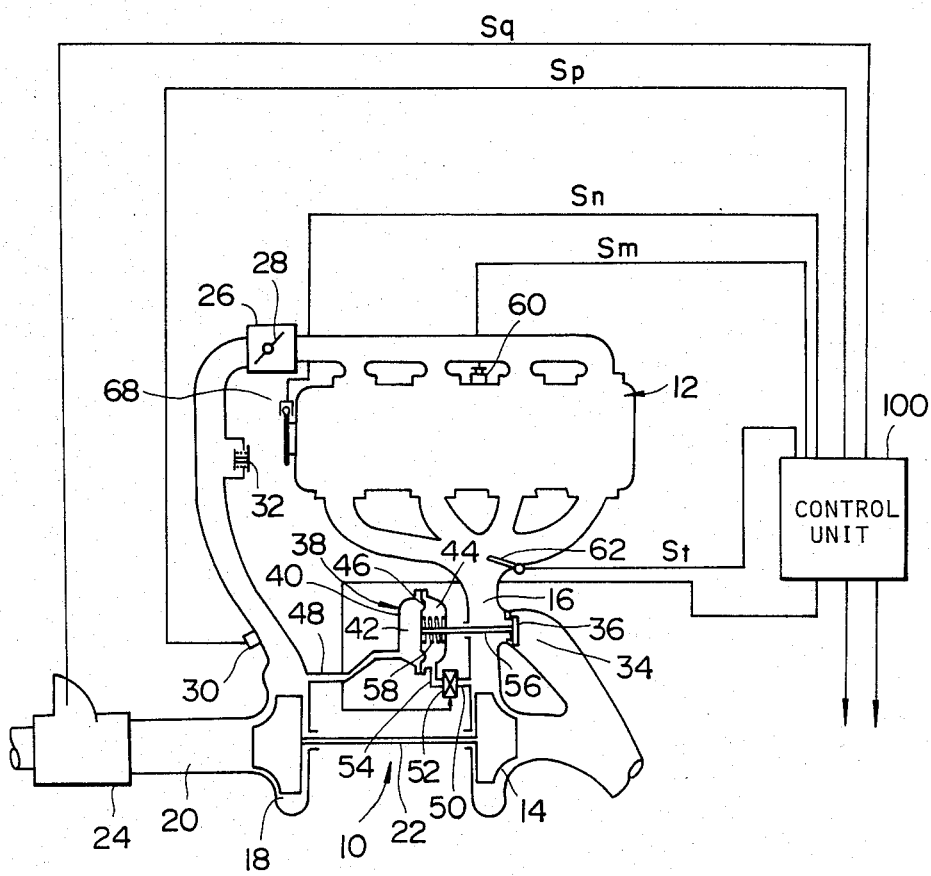
FIG. 1 is a diagrammatic illustration of a turbocharged internal combustion engine with the preferred embodiment of an engine control system according to the present invention.

Referring now to the drawings, particularly to FIG. 1, there is illustrated the general structure of a turbocharged internal combustion engine with an engine control system according to the present invention. The turbocharged engine has a turbocharger 10 for supplying intake air to the engine 12 at a controlled boost pressure. The turbocharger 10 comprises a turbine 14 inserted in an exhaust passage 16 and a compressor 18 inserted in an air induction passage 20. The turbine 14 and the compressor 18 are connected to each other via a drive shaft 22 for rotation together.

The compressor 18 is interpositioned between an air flow meter 24 and a throttle chamber 26 in which a throttle valve 28 is movably provided. In the air induction passage 20, a boost sensor 30 and a pressure-relief valve 32 are provided downstream of the compressor 18. On the other hand, a wastegate 34 bypassing the turbine 14 is provided in the exhaust passage 16. A valve 36 is provided at the inlet of the wastegate 34 for controlling the rotation speed of the turbine 14 and thus controlling the boost pressure generated by the turbocharger 10. The valve 36 is operably connected to a pressure-controlled valve actuator 38.

As shown in FIG. 1, the pressure-controlled actuator 38 has an actuator housing 40 defining therein an internal space which is divided into two chambers 42 and 44 by an elastic diaphragm 46. The chamber 42 is connected to the air induction passage 20 downstream of the compressor 18 via a passage 48 to introduce intake therein. On the other hand, the chamber 44 is connected to the exhaust passage 16 upstream of the turbine 14 via a throttling passage 50, an electromagnetic valve 52 and an induction passage 54. The valve 36 is connected to the diaphragm 46 via a valve stem 56 so as to move according to movement of the diaphragm. A bias spring 58 is inserted in the chamber 44 to exert an initial pressure on the diaphragm 46. The electromagnetic valve 52 controls the induction rate of the exhaust gas pressure into the chamber 44 to control the throttling rate of the valve 36 and thus control the rotation speed of the turbine 14.

The electromagnetic valve 52 is connected to a control unit 100 to receive a control signal. The electromagnetic valve 52 is energized and deenergized depending upon the duty cycle of the control signal for controlling the induction rate of the exhaust gas into the chamber 44. By this the pressure in the chamber 44 is controlled to vary an intercept point of the wastegate 34. Variation of the intercept point of the wastegate 34 causes variation of the induction rate of the exhaust gas into the turbine 14 to change the revolution speed of the compressor 18. Thereby, the compression or charge pressure in the air induction passage downstream of the compressor 18 is controlled. The control unit 100 is also connected to the boost sensor 30 and the air flow meter 24 to receive therefrom the signals $S_p$ and $S_q$ respectively representative of the boost pressure P in the air induction passage and the intake air flow rate Q. The control unit 100 is also connected to a knock sensor 60 installed on an engine cylinder block for detecting engine vibrations and thus detecting the knocking condition M of the engine, to receive therefrom a knocking signal $S_m$ and an exhaust gas temperature sensor 62 inserted into the exhaust passage 16 upstream of the turbine 14 to receive therefrom an exhaust gas temperature signal $S_t$ representative of the exhaust gas temperature.

The control unit 100 is also connected to an ignition control unit 64 including a spark advance controller 66. The spark advance controller 66 receives a control signal $S_{74}$ representative of the spark advance angle $\theta$ from the control unit 100 and controls the spark advance angle in accordance with the control signal $S_\theta$.

An engine speed sensor 68 is adapted to detect the revolution speed of the engine and produce an engine speed signal $S_n$ representative of the engine speed N. The engine speed signal $S_n$ is also fed to the control unit 100.

It will be appreciated that the knock sensor 60 can be constructed in various per se well-known ways. Such knock sensors have been described in detail in the British Prepublications Nos. 2,056,073, 2,056,219 and 2,061,062 respectively published on Mar. 18, 1981, Mar. 11, 1981 and May 7, 1981. Detection of knocking by means of such knock sensor signals are disclosed in the British prepublication Nos. 2,053,351 and 2,061,380 respectively published on Feb. 4, 1981 and May 13, 1981. The boost sensor 30 is a kind of pressure sensor for measuring the pressure in the air induction passage and can be constructed in various per se well-known ways. For example, such a pressure sensor has been disclosed in the British Prepublication No. 2,054,864 published on Feb. 18, 1981. The disclosures of all of the foregoing publications are incorporated herewith by reference.

Figure 2:
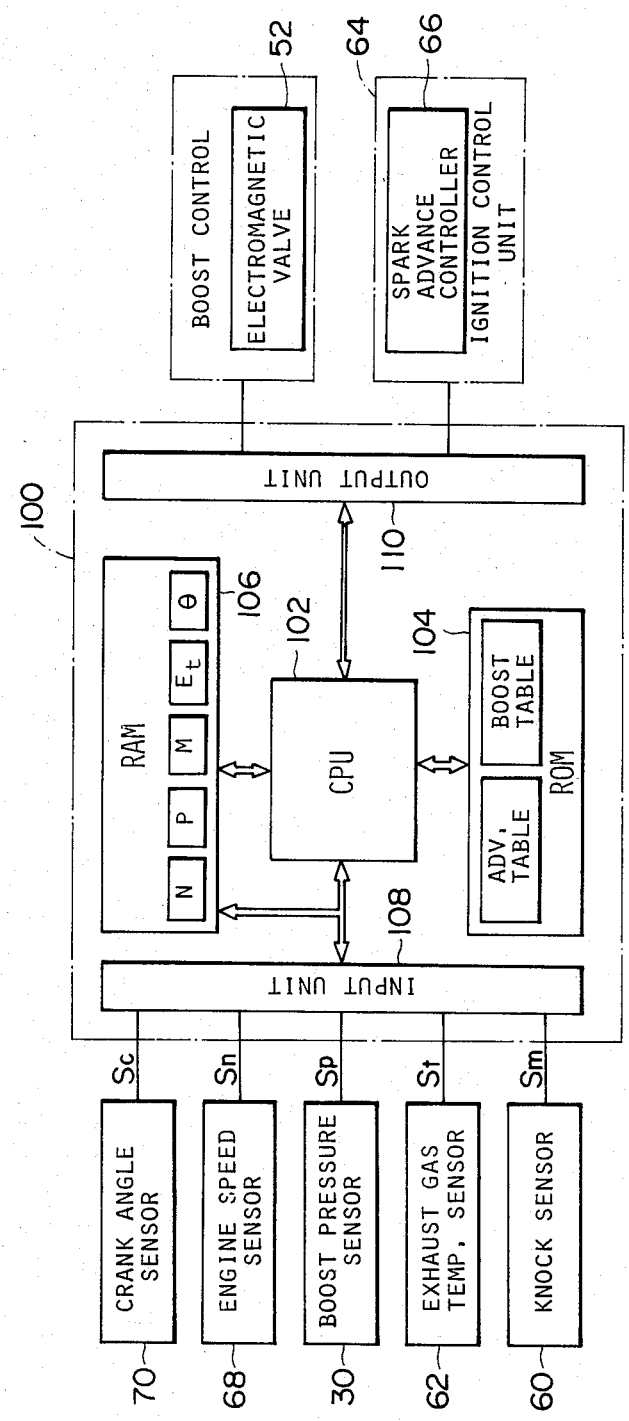
FIG. 2 is a block diagram of the control system of FIG. 1.
Figure 3:
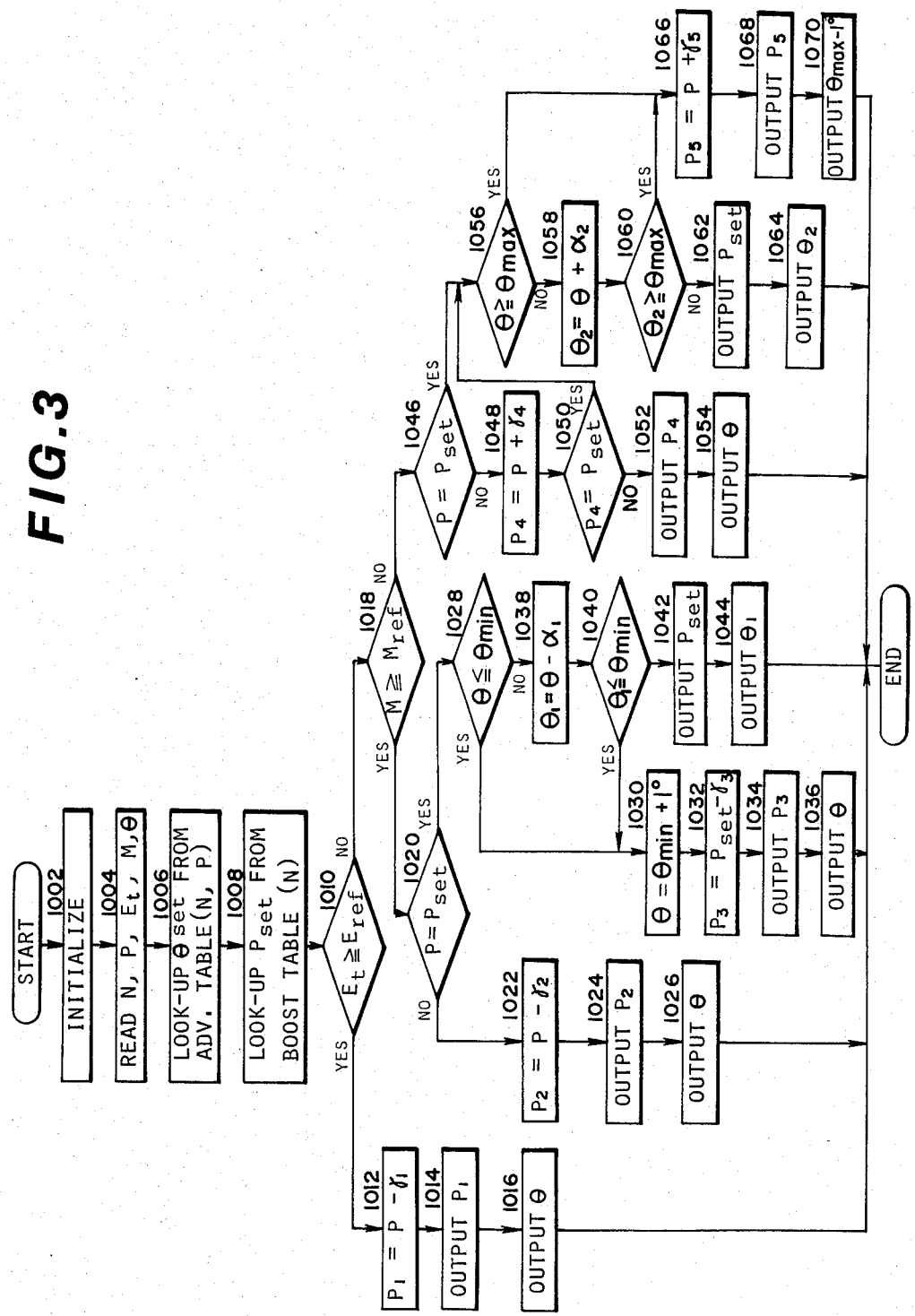
FIG. 3 is a flowchart of an engine control program to be executed by the control system.

FIG. 2 shows a circuit construction of the control unit 100 and FIG. 3 shows a flowchart of a control program for controlling the spark advance angle and the boost pressure of the turbocharger. The function of the control system will be described in detail with reference to FIGS. 2 and 3.

The control program of FIG. 3 may be executed in synchronism with the revolution of the engine for performing control of the spark ignition timing and the boost pressure of the turbocharger 10. At the first block 1002, the system is initialized. Thereafter, respective control parameters, the engine speed signal value N, the boost sensor signal value P, the exhaust gas temperature signal value $E_t$, the knocking signal value M and the spark advance $\theta$ are stored in respectively predetermined memory addresses in a RAM 106, at a block 1004. Based on the engine speed signal value N and the boost sensor signal value P, a standard advance angle value $\theta_{SET}$ is derived from a look-up table held in a ROM 104, at a block 1006. Similarly, a standard boost pressure value $P_{SET}$ is derived from a look-up table in the ROM 104 addressed on the basis of the engine speed signal value N, at a block 1008. It should be appreciated that the spark advance angle table and the boost pressure table are respectively preset in the corresponding memory addresses in the ROM 104.

At a subsequent block 1010, the exhaust gas temperature sensor signal value $E_t$ is compared to an exhaust temperature threshold value $E_{ref}$. If the value $E_t$ is larger than the value $E_{ref}$, i.e., if the exhaust gas temperature is higher the exhaust gas temperature threshold value, the boost pressure is reduced by a predetermined value $\gamma_1$ at a block 1012, i.e., $P_1 = P - \gamma_1$ is calculated. Then, the determined boost pressure $P_1$ is outputted to the electromagnetic valve 52 as a boost control signal, at a block 1014. As may be appreciated, the boost control signal is a pulse signal, the duty cycle of which corresponds to the determined boost pressure $P_1$. The spark advance angle $\theta$ is then read out from the corresponding memory address of the RAM and outputted to a spark advance controller 66 in the ignition control unit 64 as an ignition signal $S_{74}$, at a block 1016. The ignition signal $S_\theta$ is a pulse produced at a crank shaft angular position offset by the determined advance angle from the angular position corresponding to the top dead center of a piston of the engine.

If the exhaust gas temperature signal value $E_t$, as checked at the block 1010, is equal to or less than the exhaust temperature threshold $E_{ref}$, the engine knocking condition is checked at a block 1018, i.e., the knocking signal value M is compared to a predetermined knocking threshold $M_{ref}$. If the knocking signal value M is larger than the knocking threshold $M_{ref}$ and thus harmfully heavy knocking is detected, the boost pressure P is checked to see whether it is equal to the determined standard boost pressure $P_{set}$, at a block 1020. If the boost sensor signal value P is not equal to the standard pressure $P_{set}$, $(P_2 = P - \gamma_2)$ is calculated at a subsequent block 1022. The boost control signal indicative of the determined boost pressure $P_2$ is then outputted to the electromagnetic valve 52 to control the boost pressure in the air induction passage 20, at a block 1024. As in the foregoing routine, after outputting the boost control signal, the spark advance angle value $\theta$ is read out and outputted to the spark advance controller 66, at a block 1026.

On the other hand, if the boost pressure P in the air induction passage 20 is equal to the standard pressure $P_{set}$ and thus the answer at the block 1020 is YES, then, the spark advance angle $\theta$ is checked to see whether it is equal to or less than a predetermined retard-limit angle $\theta_{min}$, at a block 1028. If YES, the value $\theta$ in memory is incremented to $(\theta_{min} + 1°)$, at a block 1030. Then, the boost pressure $P_3 (= P_{set} - \gamma_3)$ is calculated, at a block 1032. Thereafter, the control signals respectively indicative of the determined boost pressure $P_3$ and the spark advance angle $\theta$ are outputted at blocks 1034 and 1036.

When the spark advance angle $\theta$, as checked at the block 1028, is greater than the predetermined retard-limit angle $\theta_{min}$, the spark advance angle $\theta$ is decremented by a given retard angle $\alpha_1$ to obtain an adjusted value $\theta_1$, at a block 1038. Then, the newly determined spark advance angle $\theta_1$ is again checked to see whether it is equal to or less than the predetermined retard-limit angle $\theta_{min}$, at a block 1040. If answer at the block 1040 is YES, the execution of the check program goes to the foregoing block 1030. On the other hand, if the answer of the block 1040 is NO, then the control signals respectively indicative of the boost pressure $P_{set}$ and the spark advance angle $\theta_1$ are outputted at blocks 1042 and 1044.

If the magnitude of knocking M is smaller than the knocking threshold $M_{ref}$, as checked at the block 1018, then the boost pressure P is compared to the standard pressure $P_{set}$ at a block 1046. When the boost pressure P is not equal to the standard pressure $P_{set}$, an adjusted boost pressure $(P_4 = P + \gamma_4)$ is calculated at a block 1048. Thereafter, the newly determined boost pressure $P_4$ is again checked to see whether it is equal to the standard pressure $P_{SET}$, at a block 1050. If the answer at the block 1050 is YES, the determined boost pressure $P_4$ is then outputted as the boost control signal at a block 1052. Thereafter, the ignition control signal indicative of the spark advance angle $\theta$ is outputted at a block 1054.

On the other hand, if the boost pressure $P_4$ is equal to the standard pressure $P_{set}$, as checked at the blocks 1046 or 1050, the spark advance angle $\theta$ is compared to a predetermined advance-limit angle $\theta_{max}$ at a block 1056. If the spark advance angle $\theta$ is less than the predetermined advance-limit angle $\theta_{max}$, the spark advance angle value is incremented by a given angle $\alpha_2$ at a block 1058. Thereafter, the advanced spark advance angle $\theta_2$ is again checked to see whether it is equal to or greater than the predetermined advance-limit angle $\theta_{max}$. If the spark advance angle $\theta_2$ is still less than the predetermined advance-limit angle $\theta_{max}$, then the boost control signal indicative of the standard pressure $P_{set}$ and the ignition control signal indicative of the adjusted angle $\theta_2$ are respectively outputted at blocks 1062 and 1064.

If the answer at either of the blocks 1056 and 1060 is YES, the boost pressure P is increased by a given value $\gamma_5$, at a block 1066. Thereafter, the boost control signal indicative of the increased boost pressure $P_5$ is outputted at a block 1068 and the ignition control signal indicative of the spark advance angle $(\theta_{max} - 1°)$ is outputted at a block 1070.

It will be appreciated that the given values $\gamma_1$ to $\gamma_5$ can have the same value for simplication of program execution and, likewise the given values $\alpha_1$ and $\alpha_2$ can have the same value.

Figure 4:
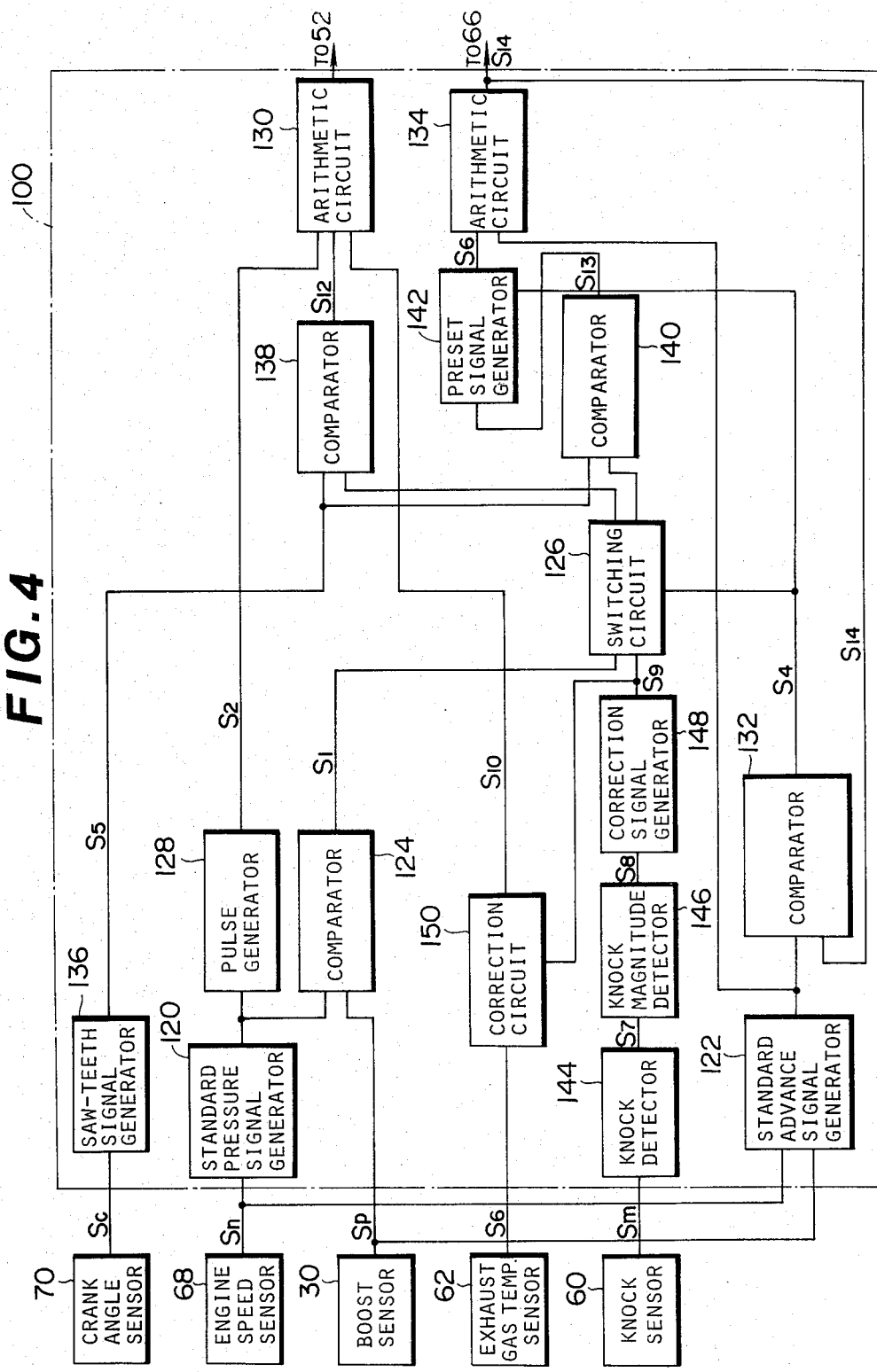
FIG. 4 is a block diagram of another embodiment of the control system of FIG. 1.
Figure 5:
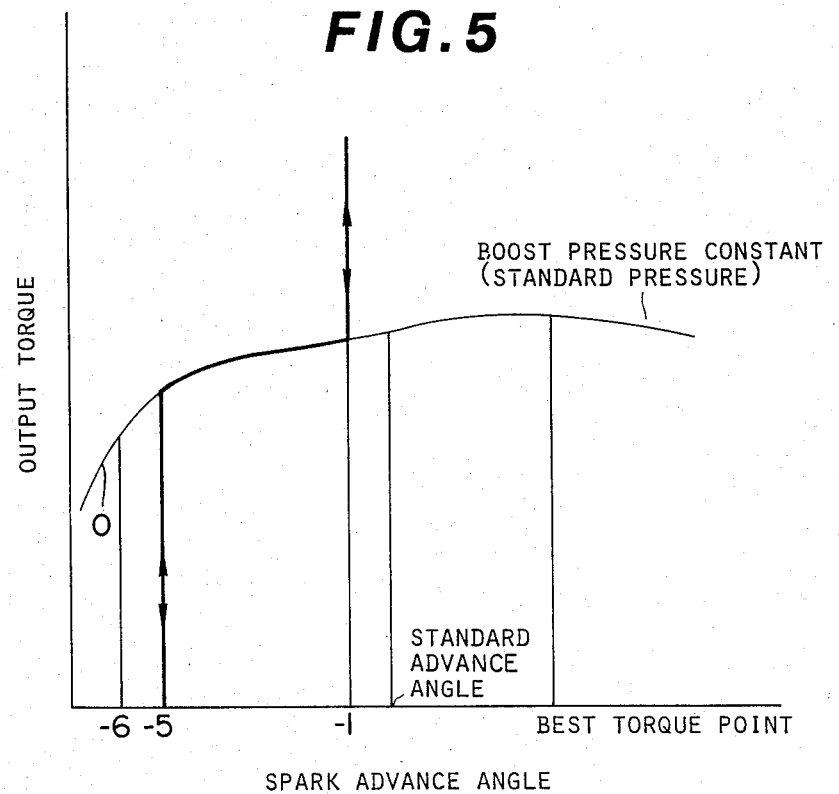
FIG. 5 shows the variation of engine output torque in relation to variation of the spark advance angle according to the control operation in the control system of the present invention.

Referring to FIG. 4, there is illustrated another embodiment of the control unit 100 in the engine control system of FIG. 1. As in the foregoing embodiment, the control unit 100 is connected to a crank angle sensor 70, an engine speed sensor 68, a boost sensor 30, an exhaust gas temperature sensor 62 and a knock sensor 60. The engine speed sensor 68 is connected to a standard pressure signal generator 120. The standard pressure signal generator 120 includes a look-up table storing standard pressure data $P_{set}$ in relation to the engine speed N, which standard pressure $P_{set}$ is determined in a range in which very light, non-disruptive engine knocking can occur for good engine performance. In consideration of engine performance, the standard pressure values $P_{set}$ fall within a rather high pressure range in order to produce or maintain high engine torque. The variation of the standard pressure $P_{set}$ with respect to spark timing can be seen in FIG. 5.

The standard pressure $P_{set}$ is thus derived from a look-up table based on the engine speed signal value N. The standard pressure signal generator 120 produces a standard pressure signal $P_{ref}$ in an analog form having a value representative of the determined standard pressure $P_{set}$.

The engine speed sensor 68 is also connected to a standard advance signal generator 122. The boost sensor 30 is also connected to the standard advance signal generator 122 for inputting thereto the boost sensor signal $S_p$. The standard advance signal generator 122 includes a two-dimensional table addressed with respect to the engine speed signal value N and the boost sensor signal value P to determine the standard advance angle $\theta_{set}$. According to the present invention, the standard advance angle $\theta_{set}$ is variable within a range near the best torque point, i.e., the point at which the engine output torque is maximized.

The standard advance signal generator 122 thus produces a standard advance signal $I_{ref}$ with a value indicative of the determined standard advance angle $\theta_{set}$.

The standard pressure signal $P_{ref}$ is fed to a comparator 124 to which the boost sensor signal $S_p$ is also inputted. The comparator 124 compares the standard pressure signal value $P_{set}$ with the boost sensor signal value P to produce a comparator signal $S_1$ when the boost sensor signal value P is less than the standard pressure signal value $P_{set}$. The comparator signal $S_1$ is supplied to a switching circuit 126. At the same time, the standard pressure signal $P_{ref}$ is also fed to a pulse generator 128. The pulse generator 128 produces a pulse signal $S_2$, the pulsewidth of which is representative of the standard pressure $P_{set}$. The pulse signal $S_2$ is fed to an arithmetic circuit 130.

The standard advance signal $I_{ref}$ is supplied to a comparator 132. The comparator 132 also receives a feedback signal $S_{14}$ indicative of the spark advance angle $\theta$ from an arithmetic circuit 134 to be explained later. The comparator 132 compares the standard advance signal value $\theta_{set}$ and the predetermined retard-limit angle retarded from a given angle with the feedback signal value $\theta$. The comparator 132 produces a comparator signal $S_4$ when the feedback signal value $\theta$ is equal to or further advanced from the standard advance signal value $\theta_{set}$ or the determined difference exceeds a predetermined value $\theta_{max}$. The comparator signal $S_4$ is fed to the switching circuit 126. At the same time, the standard advance signal $I_{ref}$ is also fed to the arithmetic circuit 134.

The crank angle sensor 70 is connected to a sawtooth wave signal generator 136 to output thereto a crank reference angle signal $S_c$. The sawtooth wave signal generator 136 is responsive to the crank reference angle signal $S_c$ to output a sawtooth wave signal $S_5$ to a pair of comparators 138 and 140. The switching circuit 126 is also connected to the comparators 138 and 140. The comparator 138 is connected to the arithmetic circuit 130. Likewise, the comparator 140 is connected to the arithmetic circuit 134 via a preset signal generator 142. The preset signal generator 142 is also connected to the comparator 132 to receive therefrom the comparator signal $S_4$. The preset signal generator 142 is adapted to produce a preset signal having a value $(\theta_{set} - 1°)$ in response to the comparator signal $S_4$ indicative of the difference zero between the $\theta_{set}$ and $\theta$ and to produce a preset signal having a value $(\theta_{set} - 5°)$ in response to the comparator signal $S_4$ indicative of the difference exceeding as a predetermined value $\theta_{max}$. Namely, the preset signal generator 142 passes, in absence of the comparator signal $S_4$, to the arithmetic circuit 134 when the the difference $(\theta_{set} - \theta)$ falls within the range defined by the threshold. If the difference $(\theta_{set} - \theta)$ falls outside of the predefined range, and the comparator signal is produced, the preset signal generator 142 produces a signal $S_6$ with an appropriate limit value. In practice, according to the shown embodiment, when the difference $(\theta_{set} - \theta)$ $S_4$ is 6° or more, the signal $S_6$ is given a value representative of 5° of retardation from the standard advance angle, and when the difference $(\theta_{set} - \theta)$ $S_4$ is less than 0°, the signal $S_6$ is given the value 1°.

Figure 6:
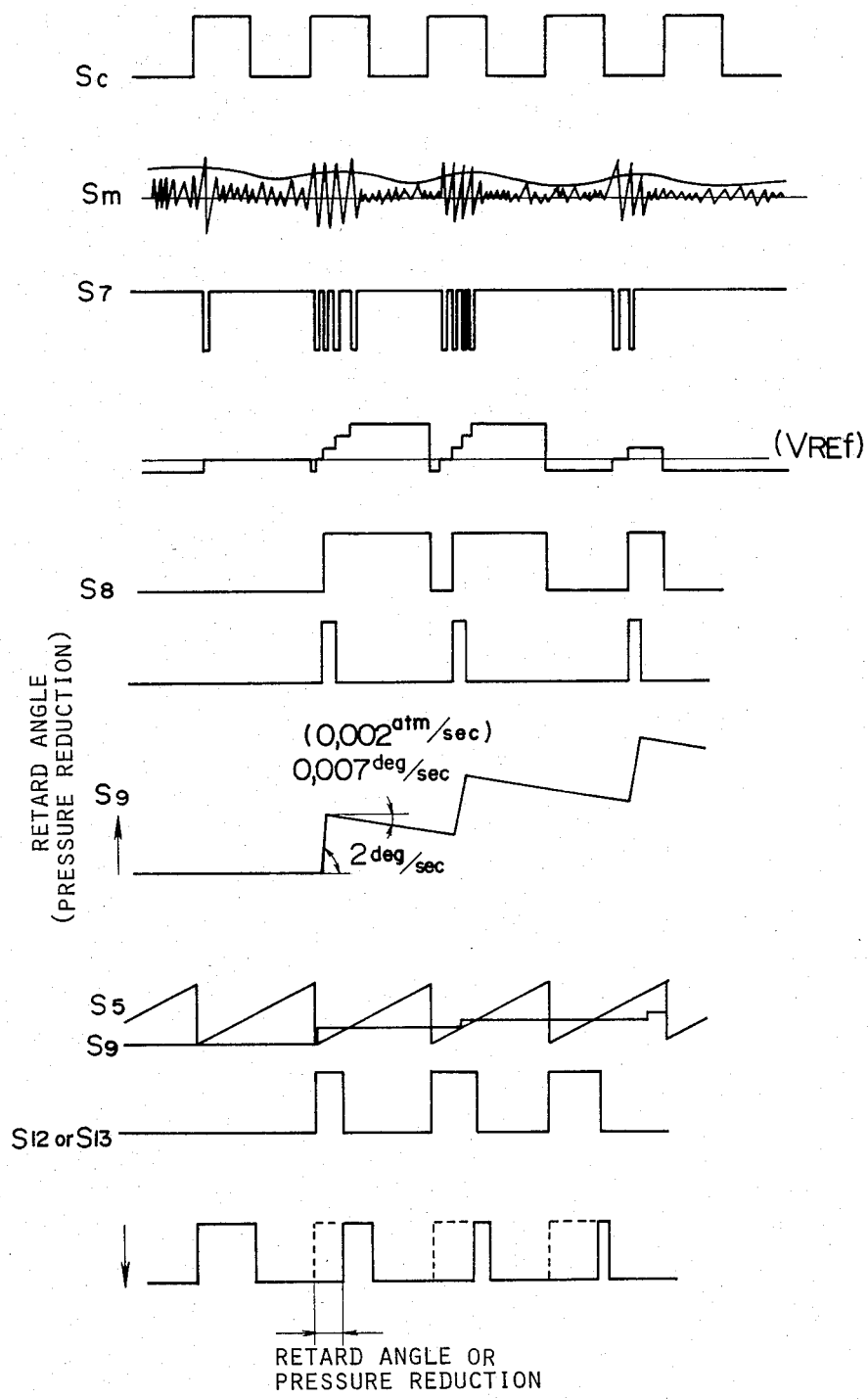
FIG. 6 is a timing chart for the control operation performed by the control system of FIG. 4.

The knock sensor 60 produces the knock sensor signal $S_m$ reflecting the frequency and amplitude of engine vibrations, as shown in FIG. 6. The knock sensor signal $S_m$ is fed to a knock detector 144. The knock detector 144 produces a pulse signal $S_7$ whenever the knock sensor signal level exceeds a variable reference level, as shown in FIG. 6. A knock magnitude detector 146 receives the pulse signal $S_7$ and counts the pulses thereof during each spark ignition cycle and compares the counter value with a given knocking threshold $M_{ref}$. The knock magnitude detector 146 outputs a pulse signal $S_8$ as long as the counter value is above the knocking threshold $V_{ref}$. A correction signal generator 148 receives the pulse signal $S_8$ to produce a correction signal $S_9$ with a variable voltage value, as illustrated in FIG. 6. The value of correction signal $S_9$ represents either the retard rate of the spark advance angle or a reduction rate of the boost pressure in the air induction passage 20, as will be described in detail hereinafter.

As will be appreciated from FIG. 6, the value of the correction signal $S_9$ is incremented by a fixed amount whenever the pulse signal $S_8$ is outputted by the knock magnitude detector 146, at a rate corresponding to a 2 deg./sec. increase of the retard angle or 0.05 atm./sec. increase of the boost drop. As will be appreciated, the correction signal value is gradually decreases at a rate corresponding to a decrease of 0.07 deg./sec. of the retard angle or 0.002 atm./sec. of the boost drop.

The correction signal $S_9$ is fed to the foregoing switching circuit 126 and continues to either the comparator 138 as the correction signal for boost pressure control or to the comparator 140 as the correction signal for spark advance control.

The exhaust gas temperature sensor 30 is adapted to produce the exhaust gas temperature signal $S_t$ having a value proportional to the exhaust gas temperature. The exhaust gas temperature signal $S_t$ of the exhaust gas temperature sensor 30 is fed to the correction circuit 150. In the correction circuit, the exhaust gas temperature signal value $E_t$ is compared with a given temperature threshold. When the exhaust gas temperature signal value $E_t$ is larger than the given temperature threshold, the correction circuit produces a correction signal $S_{10}$ representative of a given rate of boost drop. The correction signal $S_{10}$ is then fed to the arithmetic circuit 130.

Figure 7:
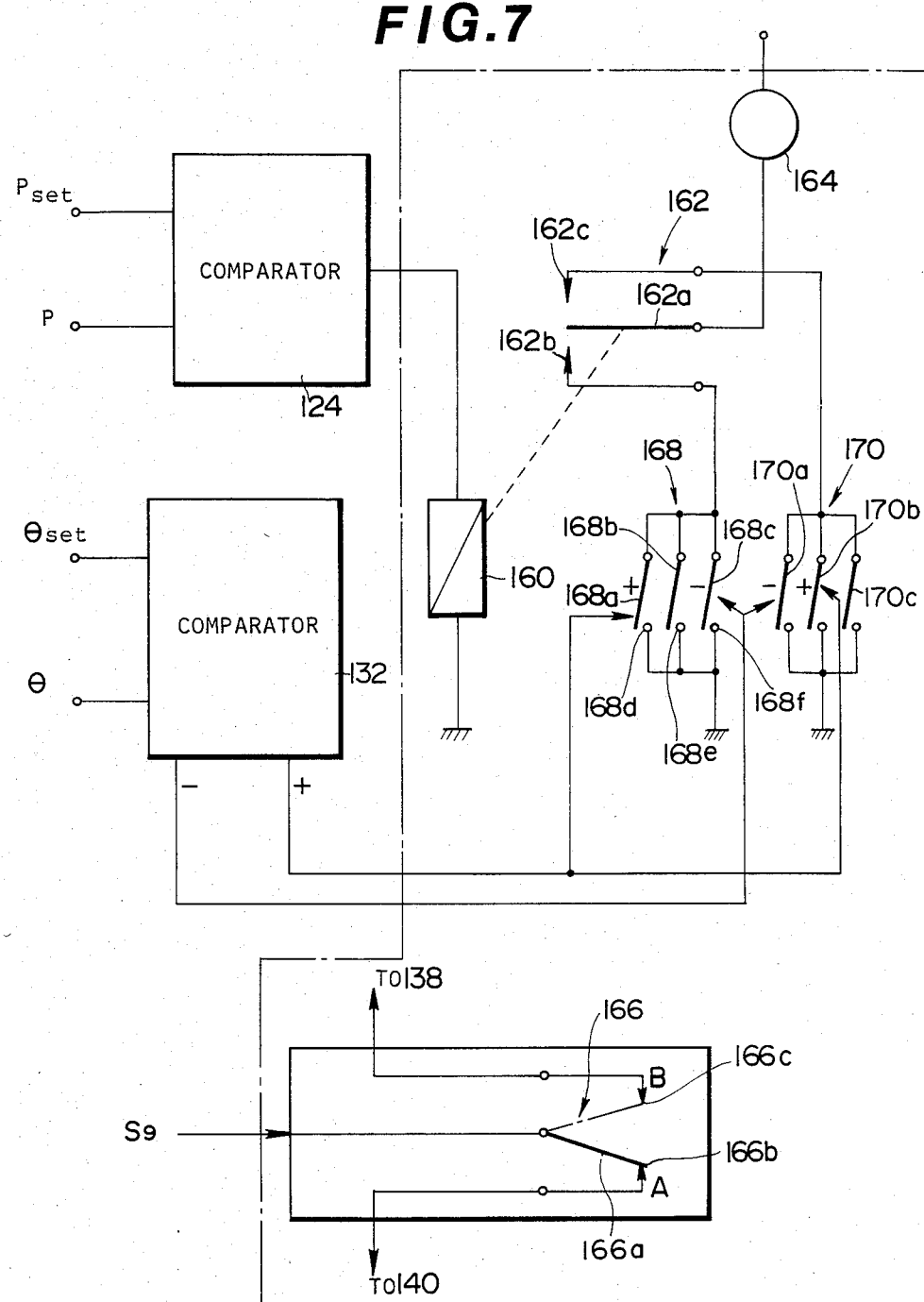
FIG. 7 is a block diagram of the preferred construction of a switching circuit in the control system of FIG. 4.

The preferred construction of the switching circuit 126 is illustrated in FIG. 7. The comparator 124 is connected to a relay 160 of the switching circuit 126, which is, in turn, associated with a selector switch 162 for switching the position of a movable switch element 162a between stationary terminals 162b and 162c. The movable switch element 162a is connected to a relay coil 164 associated with a point switch 166 including a movable switch element 166a and stationary terminals 166b and 166c which are respectively connected to the comparators 138 and 140.

The movable switch element 162a is normally urged toward the stationary terminal 162c as long as the relay 160 is maintained at deenergized position. The relay 160 is energized in response to the comparator signal $S_1$ to turn the connection of the movable switch element 162a to the stationary terminal 162b. During this transition, the selector switch 162 is temporarily turned OFF for a moment to disconnect the relay coil 164 from the comparator-signal-responsive switches 168 and 170.

The movable switch elements 168a and 170a are adapted to close in response to the comparator signal indicative of the spark advance angle $\theta$ being equal to or less than the predetermined retard limit angle. On the other hand, the movable switch elements 168c and 170c are adapted to close in response to the comparator signal of the comparator 132 indicative of the spark advance angle equal to or more than the standard spark advance angle. The movable switch elements 168b and 170b are responsive to closing of the one of the movable switch elements 168a, 170a or 168c, 170c to close and maintained at closed position until it is resetted by braking of the circuit by the opening of the selector switch 162.

The selector switch 162 is responsive to the comparator signal $S_1$ from the comparator 124 indicative of the Boost pressure P less than the standard pressure $P_{set}$ to energize the relay 160 to urge the movable contact 162a toward the stationary terminal 162b. On the other hand, the relay coil 162 is normally deenergized to connect the movable switch member 166a to the stationary terminal 166b to feed the correction signal $S_9$ from the correction signal generator 148 to the comparator 140 for correcting the spark advance angle. If the spark advance angle reached the angle across the standard advance angle or the predetermined retard-limit angle, then, one of the movable switch elements 168a, 170a or 168c, 170c are closed to close the holding movable switch elements 168b and 170b. By this, the relay coil 164 is energized to turn the movable switch element 166a towards the stationary terminal 166c to connect the correction signal generator 148 to the comparator 138 to correct the boost pressure.

Here, if the boost pressure P is increased across the standard pressure and thus the comparator signal $S_1$ turns to LOW level, the relay 160 is then deenergized to turn the connection of the movable switch element 162a from the stationary terminal 162b to the stationary terminal 162c. Upon this transition, the selector switch 162 is temporarily turned OFF for a moment. By this, the holding movable switch elements 186b and 170b are reset to disconnect the relay coil 164 to turn the switch 166 to connect the movable switch element 166a to the stationary terminal 166b.

As set forth, according to the shown embodiment, the switching of control between the spark advance correction and the boost pressure correction is performed depending upon the operational condition of the engine.

The operation hereof is similar to the foregoing embodiment in that spark ignition control and boost pressure control by controlling opening point of the wastegate are carried out selectively depending on engine operating conditions. As long as harmful engine knocking does not occur, the spark advance angle remains retarded at a given retard angle, e.g., 1°, from the standard advance angle and the boost pressure in the air induction passage is changed to the specific mechanical limit thereof. On the other hand, when the boost pressure is at standard pressure and the spark advance angle is retarded from the standard advance angle by more than the given retard angle, then the spark advance is advanced until it exceeds the standard advance angle.

On the other hand, when harmful engine knocking occurs, the control operation for the spark advance and the boost pressure will be performed according to the following schedule:

(1) when the boost pressure is above the standard pressure, the boost pressure is reduced incrementally until it drops to the standard pressure;

(2) when the boost pressure is at standard pressure and the spark advance angle is in a range between the standard advance angle and the predetermined retard-limit angle, the spark advance angle is retarded incrementally until it reaches the predetermined retard-limit angle;

(3) after the spark advance angle reaches the predetermined retard limit, it is held at a constant angular position slightly advanced from the predetermined retard-limit angle, and the boost pressure is again reduced incrementally.

In order to perform the foregoing operation, the switching circuit 126 detects engine operating conditions to switch the control between the spark advance control and the boost pressure control. As apparent from FIG. 7, in the shown embodiment, the switching circuit is normally urged toward the advance angle control.

Under normal engine conditions in which harmful engine knocking does not occur, the boost pressure P is increased from below the standard boost pressure $P_{set}$ at a given rate until it reaches the standard pressure. At this time, the wastegate 34 is closed in order to introduce all of the exhaust gas into the turbine and thereby increase the boost pressure by increasing the compressor speed. Therefore, at this stage, the boost pressure in the air induction passage 20 depends upon the engine speed. When the boost pressure P reaches the standard boost pressure, the comparator detects this and produces the comparator signal $S_1$ indicative of no significant difference between the boost pressure and the standard boost pressure. As will be appreciated from FIG. 7, the relay 160 in the switching circuit 126 is thus activated to bring the movable contact 162a into contact with the stationary terminal 162c. Since, the spark advance angle, at this time, is held at an angular angle position advanced from the most retard angle and thus both of the switches 168 and 170 are held in the OFF position, the relay coil 164 is deenergized to bring the movable switch element 166a into contact with the stationary terminal 166b, then spark advance control will performed.

In the spark advance control, the spark advance angle is advanced until it reaches the standard advance angle by a per se well known spark advancer. In this condition, the occurrence of knocking is controlled by advancing and retarding the spark advance angle within a range between the standard advance angle and the predetermined retard-limit angle. If the spark advance is advanced beyond the standard advance angle, then the comparator 132 produces a comparator signal $S_4$ indicative of the fact that the spark advance angle is equal to the standard advance angle and thus the difference therebetween is zero. The comparator signal $S_4$ is fed to the preset signal generator 142 to activate the latter. The preset signal generator 142 thus produces a correction signal $S_6$ representative of a given retard angle with respect to the standard advance angle. The correction signal $S_6$ is fed to the arithmetic circuit 134. The arithmetic circuit 134 determines the spark advance angle by obtaining logical sum of the pulse signal $S_2$ and the correction signal $S_6$ and produce the advance control signal $S_{13}$ to be fed to the spark advance controller 66 in the ignition control unit 64. At the same time, the comparator signal $S_4$ is fed to the switching circuit 126 to bring the movable switch elements 168a and 170a into with the stationary terminals 168d and 170d. As a result, the relay coil 164 is energized to bring the movable switch element 166a into contact with the stationary contact 166c. Thus, boost pressure control is again performed while the spark advance angle is held at a given angle retarded with respect to the standard advance angle.

On the other hand, if harmful engine knocking occurs, as detected by the knock magnitude detector 146 based on the knock sensor signal value M, spark advance retardation and reduction of the boost pressure will be performed in accordance with the foregoing schedule.

In more detail, if the engine operating condition is the foregoing condition (1) and thus the switching circuit 126 is adapted for boost pressure control, the correction signal $S_9$ produced by the correction signal generator 148 is fed to the comparator 138 through the switching circuit 126. The comparator 138 produces the comparator signal $S_{12}$ indicative of the relative amplitudes of the correction signal $S_9$ and the sawtooth signal $S_5$. This comparator signal $S_{12}$ is fed to the arithmetic circuit 130 which generates a boost pressure control signal for controlling the electromagnetic valve 52. This boost pressure control will be repeated until harmful engine knocking is terminated or the boost pressure drops to the standard boost pressure $P_{set}$.

If the boost pressure decreases to the standard pressure $P_{set}$ but the engine knocking continues, the control function described in the foregoing condition (2) is performed. During spark advance control in condition (2), the switching circuit 126 is adapted to connect the correction signal generator 148 to the comparator 140. Thus, as in the foregoing boost control, the comparator 140 produces a comparator signal $S_{13}$ indicative of the relative amplitudes of the sawtooth signal $S_5$ and the correction signal $S_9$. Based on the comparator signal $S_{13}$, the arithmetic circuit 134 determines the spark advance angle $\theta$ by obtaining the logical sum of the standard advance angle $\theta_{set}$ and the comparator signal value. The arithmetic circuit 134 thus produces the spark advance control signal $S_{14}$ to be fed to the spark advance controller 66 in the ignition control unit 64.

After the spark advance angle is fully retarded to the predetermined retard-limit angle, the comparator 132 produces the comparator signal $S_4$ to be fed to the preset signal generator 142 to activate the latter and to the switching circuit 126 to change the control mode from spark advance control to boost pressure control. At this time, the preset signal generator 142 produces the preset signal $S_6$ to hold the spark advance angle at a position slightly advanced with respect to the predetermined retard-limit angle.

If harmful engine knocking continues, then the control function described in the foregoing condition (3) is performed. The boost pressure control in this condition (3) is the same as that of foregoing condition (1).

As will be appreciated, according to the shown embodiments, the harmful engine knocking can be eliminated without significantly influencing engine performance, particularly with regard to the transient response characteristics of the engine.

During the foregoing control operations, if exhaust gas over-heating is detected, the boost pressure is reduced regardless of other factors in order to maintain the exhaust gas temperature in a range in which an exhaust gas purifier can be fully active and will not be damaged by the exhaust gas heat.

The foregoing second embodiment can be modified with keeping the above-described desired functions. For example, as shown in FIG. 8, the correction circuit 150 and the output of switching circuit 126 leading to comparator 138 are connected to a standard pressure correction circuit 180 which corrects the predetermined standard pressure signal in accordance with engine conditions in order to improve the response of the control system to variations in the engine operating conditions.

As set forth, the present invention fulfills all of the objects and advantages sought therefor.

What is claimed is:

1. An engine control system for a turbocharged internal combustion engine for controlling spark ignition timing and charge pressure in an air induction passage, comprising:

first means for measuring engine speed and producing a first signal having a value representative of the engie speed;

second means for measuring charge pressure in the air induction passage of the engine and producing a second signal having a value representative of the charge pressure;

third means for detecting an engine knocking condition and producing a third signal indicative of the engine knocking condition;

fourth means for controlling charge pressure relative to a given optimum pressure, said fourth means including an electrically-controlled valve for controlling said charge pressure;

fifth means for controlling a spark advance angle within a predetermined variation range defined by predetermined extremes for defining the spark ignition timing; and sixth means for operating said fourth and fifth means in order to independently control charge pressure and spark ignition timing in accordance with the engine operating conditions represented by said first to third signals, said sixth means being responsive to said third signal to selectively operate one of said fourth and fifth means for knock prevention, said sixth means defining said variation range of said spark advance angle and said optimum charge pressure value and operating said fourth means to adjust said charge pressure while holding said spark advance angle at an angle adjacent one of said extremes and said fifth means to adjust said spark advance angle while holding said charge pressure at said optimum charge pressure value.

2. An engine control system for a turbocharged internal combustion engine for controlling spark ignition timing and charge pressure in an air induction passage, comprising:

first means for measuring engine speed and producing a first signal having a value representative of the engine speed;

second means for measuring charge pressure in the air induction passage of the engine and producing a second signal having a value representative of the charge pressure;

third means for detecting an engine knocking condition and producing a third signal indicative of the engine knocking condition;

fourth means for controlling charge pressure relative to a given standard pressure, said fourth means including an electrically-controlled valve for controlling said charge pressure;

fifth means for controlling a spark advance angle within a predetermined range defined by upper and lower extremes defining the spark ignition timing; and sixth means for producing a control signal for selectively operating said fourth and fifth means in order to independently control charge pressure and spark ignition timing in accordance with the engine operating conditions as indicated by said first to third signal values, said sixth means being responsive to said third signal to selectively operate one of said fourth and fifth means to reduce said charge pressure and to retard said spark advance angle for knock prevention, said sixth means defining a given advance angle value, said variation range of spark advance angle and said standard charge pressure, and operating said fourth means to adjust the charge pressure while holding the spark advance angle at an angle adjacent one of said extremes and said fifth means to adjust the spark advance angle while holding the charge pressure at said standard charge pressure.

3. The system as set forth in claim 1 wherein said sixth means adjust said given advance angle value and given charge pressure value in accordance with the engine operating conditions as indicated by said first to third signal values.

4. The system as set forth in claim 3, wherein said sixth means determines said given advance angle value on the basis of said first and second signal values and determines said given charge pressure value on the basis of said first signal value.

5. The system as set forth in claim 3, which further comprises seventh means for measuring exhaust gas temperature and producing a fourth signal having a value indicative of the exhaust gas temperature, and said sixth means is responsive to said fourth signal having the value exceeding a given threshold to operate said fourth means to reduce the charge pressure regardless of the spark advance angle.

6. The system as set forth in claim 5, wherein said fourth and fifth means respectively reduce the charge pressure and the spark advance angle in response to said third signal in an incremental manner.

7. The system as set forth in claim 4, wherein said sixth means operates said fourth and fifth means in such a manner that;

(a) while the spark advance angle is at said given value, said fourth means is operated to vary the charge pressure depending upon the engine knocking condition;

(b) when the charge pressure reaches said given charge pressure, said fourth means holds the charge pressure at said given pressure value and said fifth means becomes active to vary the spark advance angle within said variation range; and (c) when the spark advance angle reaches an end of said variation range, said fifth means holds the spark advance angle at said given advance angle value and said fourth means become active to vary the charge pressure.

8. In an engine control system for a turbocharged internal combustion engine for controlling spark ignition timing and charge pressure in order to prevent the engine from knocking, a method for spark advance control and charge pressure control comprising the steps of:

measuring engine speed;

measuring charge pressure in an air induction passage of the engine;

detecting a harmful engine knocking condition;

controlling spark advance angle with reference to a given standard spark advance angle determined on the basis of the engine speed and charge pressure in the air induction passage, said spark advance angle being variable in a given range between upper and lower extremes across said given standard spark advance angle;

controlling charge pressure with reference to a given standard charge pressure determined on the basis of the engine speed, said charge pressure being variable relative to said standard charge pressure;

selectively performing said spark advance control and said charge pressure control independently, wherein said spark advance control is performed while said charge pressure control is disabled so that said charge pressure is held at said standard charge pressure and said charge pressure control is performed while said spark advance control is disabled so that said spark advance angle is held at an angle within said given spark advance angle variation range relative to said standard advance angle, and said spark advance control serves to retard the spark advance angle at a given retard rate and said charge pressure control serves to reduce the charge pressure at a given reduction rate, in response to detection of harmful engine knocking.

9. The method as set forth in claim 8, which is further composed of the steps of detecting an over-heating condition of the exhaust gas of the engine and performing the charge pressure control to reduce the charge pressure in preference to other control functions in response to the detection of the exhaust gas over-heating.

10. The method as set forth in claim 8, wherein said given spark advance angle is variable depending upon the engine speed and the charge pressure, and said given standard charge pressure is variable depending upon the engine speed.

11. The method as set forth in claim 10, wherein said spark advance control and said charge pressure control are selectively performed in such a manner that;

(a) while the spark advance angle is at said given standard advance angle, said charge pressure is adjusted in accordance with the engine knocking condition;

(b) when the charge pressure reaches said given charge pressure, the charge pressure is held at said given pressure and said spark advance control is performed to adjust the spark advance angle within said variation range; and
(c) when the spark advance angle reaches an end of said variation range, the spark advance angle is held at said given standard advance angle and said charge pressure control is performed to adjust the charge pressure.

12. The system as set forth in claim 2, wherein said sixth means adjust said given advance angle value and given charge pressure value in accordance with the engine operating conditions.

13. The system as set forth in claim 12, wherein said sixth means determines said given advance angle value on the basis of said first and second signal values and determines said given charge pressure value on the basis of said first signal value.

14. The system as set forth in claim 12, which further comprises seventh means for measuring exhaust gas temperature and producing a fourth signal having a value indicative of the exhaust gas temperature, and said sixth means is responsive to said fourth signal having the value exceeding a given threshold to operate said fourth means to reduce the charge pressure regardless of the spark advance angle.

15. The system as set forth in claim 14, wherein said fourth and fifth means respectively reduce the charge pressure and the spark advance angle in response to said third signal in an incremental manner.

16. The system as set forth in claim 13, wherein said sixth means operates said fourth and fifth means in such a manner that:
(a) while the spark advance angle is at said given value, said fourth means is operated to vary the charge pressure depending upon the engine knocking condition;
(b) when the charge pressure reaches said given charge pressure, said fourth means holds the charge pressure at said given pressure value and said fifth means becomes active to vary the spark advance angle within said variation range; and
(c) when the spark advance angle reaches an end of said variation range, said fifth means holds the spark advance angle at said given advance angle value and said fourth means becomes active to vary the charge pressure.

17. The method as set forth in claim 9, wherein said given spark advance angle is variable depending upon the engine speed and the charge pressure, and said given standard charge pressure is variable depending upon the engine speed.

18. The method as set forth in claim 17, wherein said spark advance control and said charge pressure control are selectively performed in such a manner that:
(a) while the spark advance angle is at said given standard advance angle, said charge pressure is adjusted in accordance with the engine knocking condition;
(b) when the charge pressure reaches said given charge pressure, the charge pressure is held at said given pressure and said spark advance control is performed to adjust the spark advance angle within said variation range; and
(c) when the spark advance angle reaches an end of said variation range, the spark advance angle is held at said given standard advance angle and said charge pressure control is performed to adjust the charge pressure.

* * * * *